Feb. 4, 1936.   G. R. GOLDTHWAITE   2,029,368
METHOD AND APPARATUS FOR CONDITIONING AIR
Filed Dec. 15, 1931   3 Sheets-Sheet 1
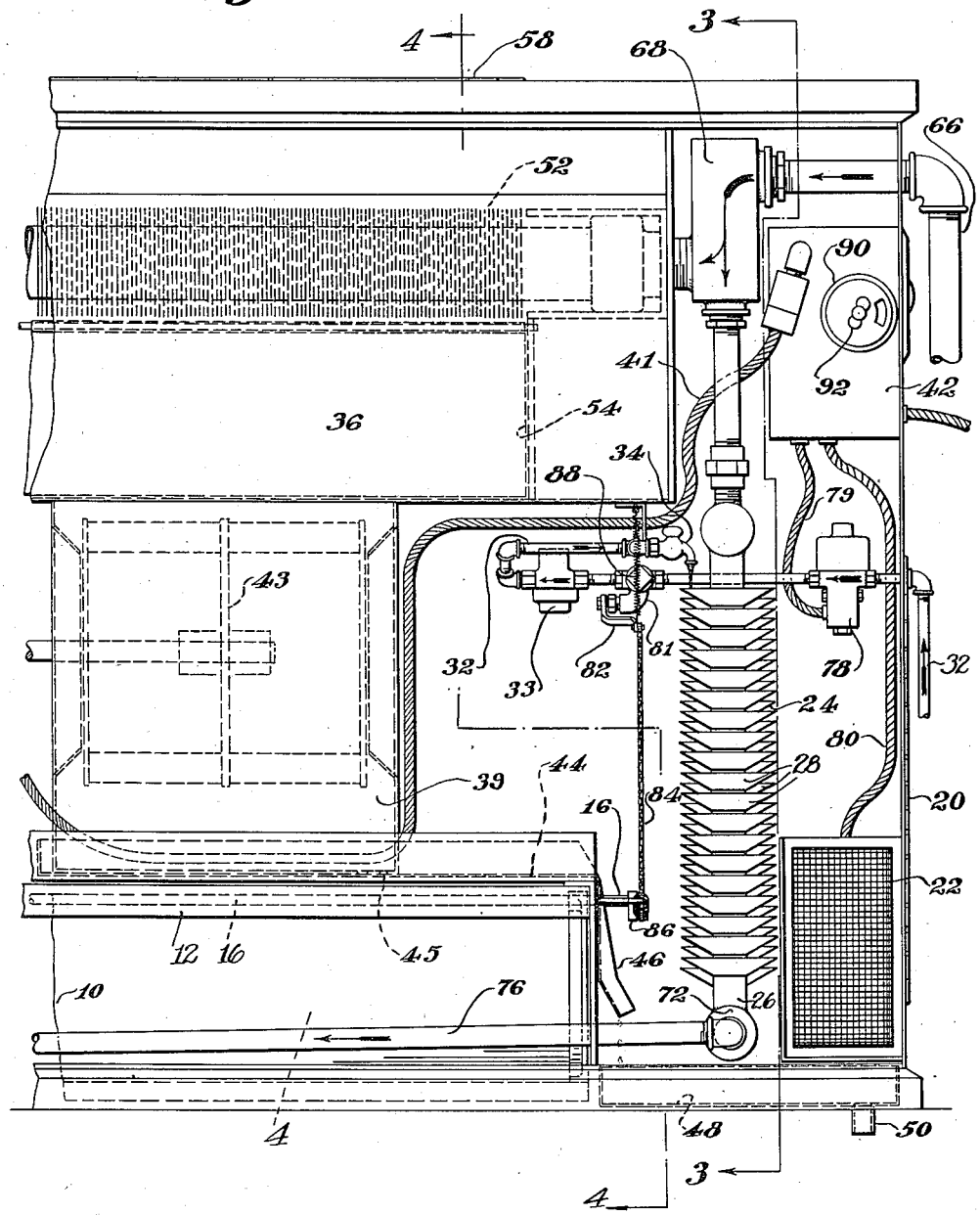
Witness
Paul F. Bryant
Inventor
George R. Goldthwaite
by his attorneys
Van Everen, Fish, Hildreth & Cary Feb. 4, 1936.  G. R. GOLDTHWAITE  2,029,368
METHOD AND APPARATUS FOR CONDITIONING AIR
Filed Dec. 15, 1931  3 Sheets-Sheet 2
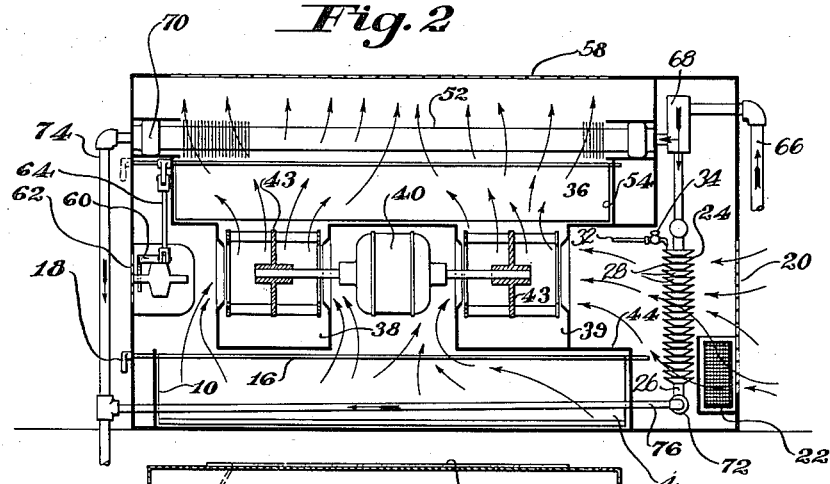
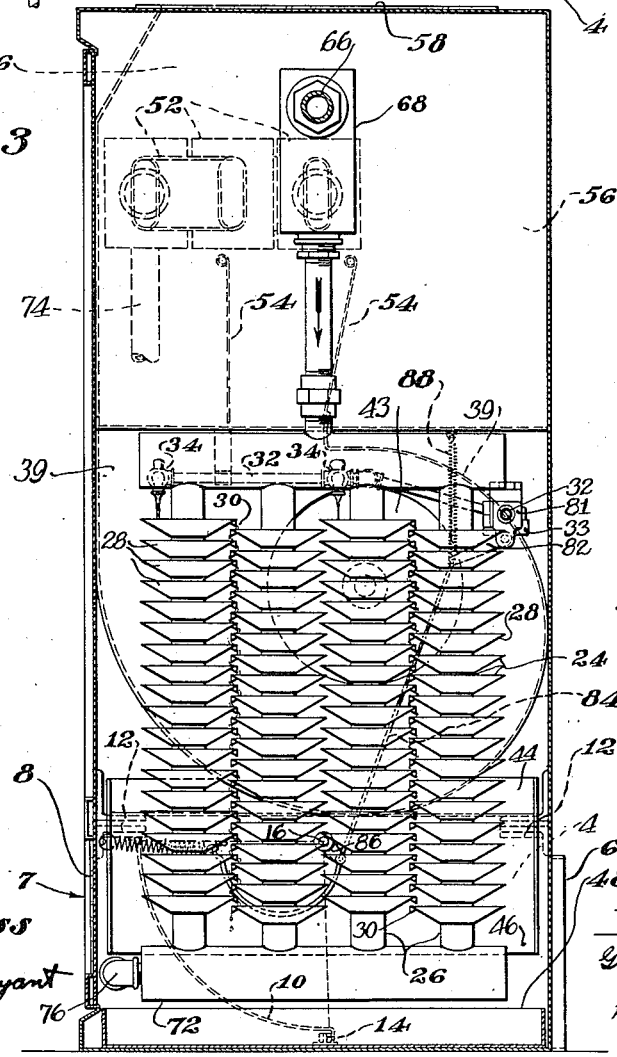
Witness
Paul F. Bryant
Inventor
George R. Goldthwaite

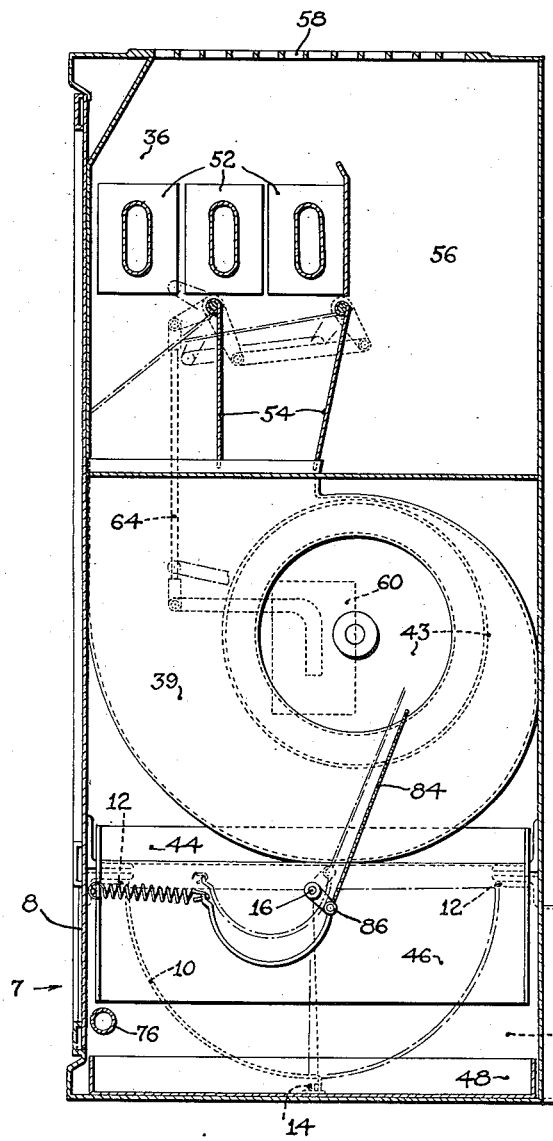
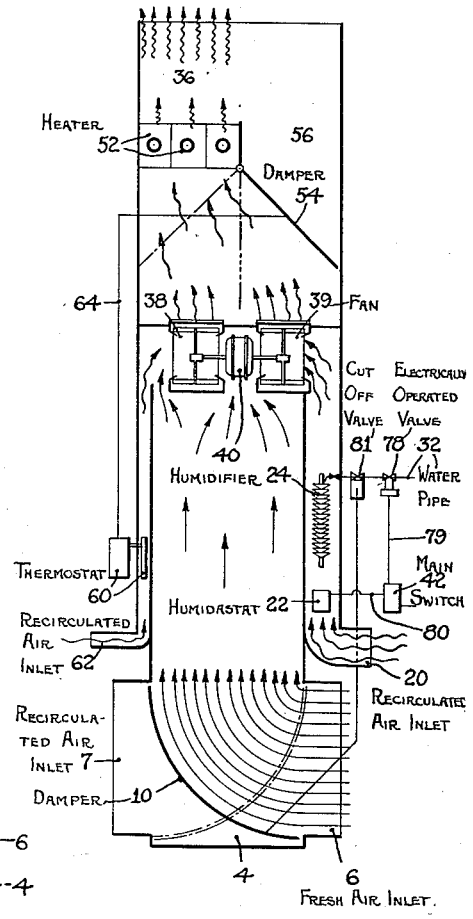

Patented Feb. 4, 1936

2,029,368

UNITED STATES PATENT OFFICE 2,029,368

METHOD AND APPARATUS FOR CONDITIONING AIR

George R. Goldthwaite, South Easton, Mass., assignor to B. F. Sturtevant Company, Hyde Park, Mass., a corporation of Massachusetts Application December 15, 1931, Serial No. 581,174

8 Claims. (Cl. 257—138)

The present invention relates to methods and apparatus for conditioning air, and more particularly to methods and apparatus for heating and humidifying the same.

The principal object of the present invention is to provide a method and apparatus for conditioning air by which the temperature and humidity of the air delivered to an enclosure may be accurately controlled, and in which the addition of fresh air may be readily accomplished while maintaining the proper temperature and humidity conditions.

Another object of the invention is to provide a simple, efficient, and inexpensive unit ventilating and heating apparatus for supplying air of substantially any desired condition to an enclosure.

With these and other objects in view, as will hereinafter appear, one feature of the invention consists of a method and apparatus whereby air is delivered to an enclosure as a mixture of two or more portions, one portion comprising air continuously withdrawn and recirculated, and another comprising either recirculated or fresh air, the control of humidity being effected by adding moisture to the first portion only, which is thereby intensively humidified, and then mixing said portion with the second portion which preferably comprises the greater part of the air delivered to the enclosure. The portions are mixed and heated to the desired temperature, preferably under the control of automatic devices responsive to the temperature of recirculated air.

Inasmuch as the air in the enclosure is ordinarily not subject to any considerable diminution in relative humidity, so long as no fresh air is admitted, another feature of the invention provides for cutting the humidifying apparatus completely out of operation when all of the air being treated comprises withdrawn and recirculated air. This feature provides fairly close regulation of humidity without the use of automatic control devices. Where more accurate regulation is desired, the continuously recirculated portion of the air is variably conditioned under the action of automatic devices responsive to the moisture content.

Other features of the invention consist in certain novel features of construction, combinations and arrangement of parts hereinafter described and particularly defined in the claims.

In the accompanying drawings illustrating what is now considered the preferred embodiment of the invention, Fig. 1 is a front elevation of a portion of a unit heating ventilator embodying the present invention with the front closure or panel removed to show the interior of the apparatus; Fig. 2 is a diagrammatic vertical sectional view on a reduced scale showing the general arrangement of the various parts and the directions of air flow through the apparatus; Fig. 3 is a vertical sectional view on line 3—3 of Fig. 1, Fig. 4 is a vertical sectional view on line 4—4 of Fig. 1, and Fig. 5 is a schematic diagram showing the essential features of the invention and their relative arrangement.

The illustrated embodiment of the invention comprises a casing having in the bottom a main inlet chamber 4 which communicates with a fresh air inlet 6 in the rear of the casing, and a recirculated air inlet 7 in the front, this latter opening being provided with a suitable ornamental screen or grille 8. The inlet chamber 4 extends across the greater part of the casing. A quadrantal air valve or damper 10 is mounted to cut off either the fresh air inlet 6 or the recirculated air inlet 7 from the inlet chamber, at the same time opening the communication from the chamber to the other inlet. The damper is adapted to close against suitable stops, indicated at 12 and 14. The damper is operated by a shaft 16 and a manually controlled handle 18 mounted externally of the casing. The damper is snap acting, as in the construction described in the Bridges application Serial No. 521,997 filed March 12, 1931, so that it can admit only recirculated air or fresh air, but not a mixture thereof, to the inlet chamber.

The air delivered through the inlet chamber, whether fresh air or air withdrawn from the room, comprises the major portion of the air passing through the apparatus. This air is not subjected to the action of the humidifying devices. These devices operate exclusively upon additional air which is continuously withdrawn from the room through a grille in the right-hand side of the casing, a portion of such air passing through a humidostat 22 placed in the front corner of the casing.

This additional or auxiliary air, which is continuously recirculated regardless of the flow of air through the main inlet chamber, is passed over a heating and humidifying section indicated generally at 24, which is preferably of the form disclosed in the Goldthwaite application Serial No. 559,171 filed August 25, 1931. This section comprises a plurality of vertical heating tubes 26, on which are mounted overlapping staggered concave fins 28, the fins of adjacent columns having superposed discharge lips 30 to carry continuous streams of water downwardly through the transverse current of air. Water is supplied to the uppermost fins of alternate heating tubes through a pipe 32, a pressure reducing valve 33, and pet-cocks 34. The supply of water to the heating and humidifying section is controlled in a manner to be presently described in detail.

The main air from the main inlet chamber, as well as the auxiliary continuously recirculated air entering the inlet 20, is delivered to a heating chamber 36 in the top of the casing. To this end, a pair of double inlet centrifugal fans 38 and 39 are mounted above the inlet chamber 4. The fans are driven by a motor 40 supplied by a cable 41 leading from the main switch 42. The wheel of each fan is divided by an imperforate central plate 43. Both inlets of the left-hand fan 38 and one inlet of the right hand fan 39 communicate directly with the main inlet chamber 4, while the other inlet of the latter fan communicates directly with the heating and humidifying section 24. A partition 44 between the housing of the fan 39 and the casing separates the auxiliary air from the main air. It will be seen that with this construction, the fans handle approximately 75% of main air and 25% of auxiliary air.

Inasmuch as the auxiliary air which one side of the fan 39 handles may have a high moisture content, provision is made for discharging any condensate that may form or collect in the fan housing. The partition 44 is formed as a pan, as shown in Fig. 1, and the fan housing is provided with one or more small holes 45 in the bottom to discharge the condensed water into the pan. A spout 46 leads the water to a main drip pan 48, which also serves to collect excess water from the heating and humidifying section 24, and which ultimately discharges the water through a sewer connection 50.

The fans deliver the air upwardly into the heating chamber 36, in the front part of which is an extended surface heater 52 disposed lengthwise of the casing. Control of heating is effected by a pair of swinging dampers 54 disposed below the heater, and arranged to by-pass variable quantities of the air through the unheated space 56 in the rear of the casing. These dampers are placed directly above the fan outlets and are arranged longitudinally of the casing, so that they act to divide all of the air into heated and unheated portions, the proportions of heated and unheated air depending on the positions of the dampers. These two portions reunite and mix in the upper part of the casing and are discharged to the room through the top grille 58.

The position of the dampers 54 is controlled by a thermostat 60 which is affected by a small current of air continuously withdrawn from the room through a grille 62 in the left end of the casing. The thermostat, which may be of any suitable form, is connected by linkage 64 with the dampers 54. This construction is as shown in said Bridges application.

Steam or other heating medium is supplied to the heater 52 and the section 24 in the following manner:— The main steam supply pipe 66 connects internally of the casing with a header 68, into which both the horizontal tubes of the heater 52 and the vertical tubes of the section 24 are connected. The heater 52 and the section 24 are provided with return headers indicated at 70 and 72 respectively, which connect with return steam pipes 74 and 76. Steam is continuously supplied to both heaters, the temperature of the air being placed under the control of the dampers 54.

It will be noted that the auxiliary air entering through the opening 20 is at all times subjected to the heating effect of the heating and humidifying section 24, whether or not humidification is being effected, the temperature of the combined main and auxiliary air streams being determined by the amount of additional heat imparted by the extended surface heater 52.

Two humidification controls are illustrated, one operating automatically with considerable accuracy of regulation from the humidostat, and the other operated manually to cut off all humidification when all the air is recirculated. Both controls are used in the preferred form of the invention, but one of them may be dispensed with, if desired.

The humidostat control comprises an electrically operated valve 78 in the water line 32, the opening and closing of the valve being controlled from the humidostat 22. Electrical connections 79 and 80 are made from a switch box 42 to the valve and to the humidostat. By this means, the water delivered to the heating and humidifying section is regulated by the relative humidity of the air which enters through opening 20 from the room or enclosure.

The manual control comprises a cut-off valve 81 having an arm 82 connected by a chain 84 with a crank 86 on the damper shaft 16. The valve is normally held in closed position by a spring 88. The valve is positively opened when the main inlet damper 10 is moved to the position of Fig. 3 to introduce fresh air, but is closed by the spring when the damper is moved to the opposite position to admit withdrawn air. This control may be used exclusively where close regulation is not necessary, any wide variations in humidity conditions being accommodated by manual adjustment of the petcocks. Moreover, this control is desirable as a supervisory control when regulation by the humidostat is employed, because when the air is entirely recirculated, continuous addition of moisture is ordinarily unnecessary.

Switch devices are provided for controlling the electric circuits through the humidostat, water valve and fan motor, and preferably these are incorporated in a single switch structure 90 with a single actuating member 92.

In operation, the apparatus delivers the greater portion of the air under the selective control of the damper 10, and the remainder as recirculated air through the heating and humidifying section with a supplemental small stream through the grille 62 adjacent the thermostat. The air from these several sources is mixed upon being discharged from the fans and the mixed or combined streams are subjected to the heating action by the heater. When the damper 10 is set to admit fresh air, the auxiliary air is heated and intensively humidified in the section 24, the moisture content of the auxiliary air being sufficiently increased to bring the total air to the desired relative humidity. By thus intensively heating and humidifying a relatively small proportion of the air, a small humidifying section may be employed, the duty of heating the air being borne by the heater 52 which may be of relatively simple and inexpensive form.

Having thus described the invention, what is claimed is:

1. The method of supplying conditioned air to an enclosure which consists in continuously withdrawing air from the enclosure, selectively adding thereto either air withdrawn from the enclosure or fresh air, controlling the humidity of the total air by adding moisture to only said first-mentioned withdrawn air and only when fresh air is to be added thereto, and delivering the entire air to the enclosure.

2. The method of supplying conditioned air to an enclosure which consists in continuously withdrawing air from the enclosure, selectively adding thereto either air withdrawn from the enclosure or fresh air, controlling the humidity of the total air by adding moisture to only said first-mentioned withdrawn air and only when fresh air is to be added thereto, heating both portions of the air, and delivering the heated air to the enclosure.

3. Unit air conditioning apparatus having, in combination, a casing having a main fresh air inlet and a main recirculated air inlet, means for selectively opening one of the inlets, an auxiliary recirculated air inlet, means responsive to the position of the inlet opening means for humidifying the air admitted through the auxiliary inlet when the fresh air inlet is open, means for cutting off humidification of the auxiliary air when the fresh air inlet is closed, and means for heating both portions of the air.

4. Unit air conditioning apparatus having, in combination, a casing having a main fresh air inlet and a main recirculated air inlet, a damper for selectively opening one of the inlets, an auxiliary recirculated air inlet, a heating and humidifying section including heating tubes having concave extended fins, means for supplying water to the fins, the heating and humidifying section being swept by the auxiliary air only, means associated with the damper for cutting off the supply of water when the main recirculated air inlet is open, and means for heating the main and auxiliary air.

5. Air conditioning apparatus having, in combination, a casing having a main air inlet and an auxiliary air inlet, heating and humidifying devices for heating and humidifying the air entering the auxiliary inlet, a double intake fan wheel and casing, the fan wheel having an imperforate middle partition, the intake of one-half of the fan being connected with the main inlet and the intake on the other half of the fan being connected with the auxiliary inlet, and a drip pan beneath that portion of the fan connected with the auxiliary intake, such portion of the fan casing being provided with a drainage opening to permit the escape of liquid from the fan casing into the pan.

6. In a unit apparatus for conditioning air a casing having a main air inlet chamber provided with fresh air and recirculated air inlets, damper means for opening one and closing the other of said inlets, a humidifier within the casing, means for supplying humidifying liquid to the humidifier including a supply valve, and connections between the damper means and said valve for causing simultaneous movement of the damper means and the valve to close the valve when the damper is moved to close the fresh air inlet.

7. In a unit apparatus for conditioning air a casing having a main air inlet chamber provided with fresh air and recirculated air inlets, damper means for opening one and closing the other of said inlets, a humidifier within the casing, means for supplying himidfying liquid to the humidifier including means for regulating the supply of liquid, connections between the damper means and the liquid regulating means for actuating the latter responsively to the movement of the former to cut off the liquid when the fresh air inlet is closed, and a humidostat connected with said liquid regulating means.

8. In a unit apparatus for conditioning air a casing having a main air inlet chamber provided with fresh air and recirculated air inlets, damper means for opening one and closing the other of said inlets, a humidifier within the casing, means for supplying humidifying liquid to the humidifier, a cut-off valve for cutting off the humidifying liquid, connections between said cut-off valve and the damper means for closing the cut-off when the fresh air inlet is closed and for opening the valve when the fresh air inlet is opened, a regulating valve for the liquid supply, and a humidostat for controlling the regulating valve.

GEORGE R. GOLDTHWAITE.